UNITED STATES PATENT OFFICE.

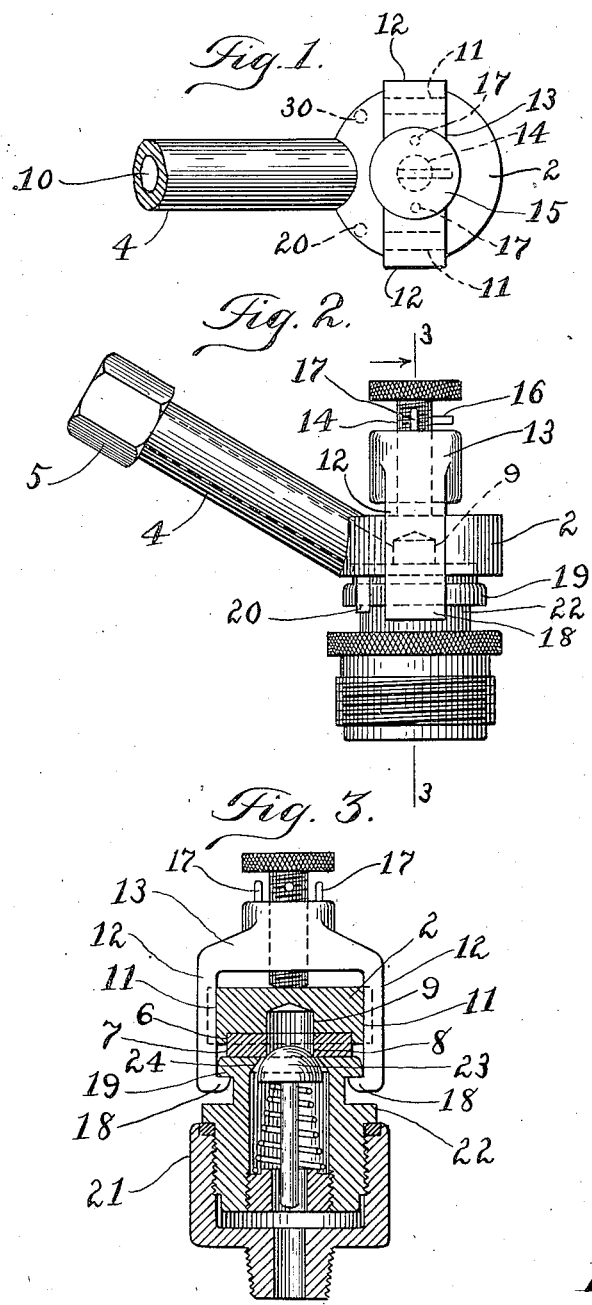

ABRAHAM NOVICK, OF NEW YORK, N. Y.

COUPLING.

1,325,902. Specification of Letters Patent. Patented Dec. 23, 1919.

Application filed July 1, 1918. Serial No. 242,729.

*To all whom it may concern:*

Be it known that I, ABRAHAM NOVICK, a citizen of the United States, and a resident of New York, borough of Manhattan, in the county of New York and State of New York, have invented certain new and useful Improvements in Couplings, of which the following is a specification.

This invention relates to couplings and is particularly directed to devices of the class specified adapted for use in connection with grease guns for filling the grease cups of machinery and more particularly for filling the grease cups of automobiles. The object of my improvements is to provide a coupling of great simplicity which can be operated with rapidity and yet be held securely and precisely in place when in use and removed after use with a minimum of effort. Other objects will appear later herein.

My invention is illustrated in its preferred embodiment in the drawing accompanying this specification, wherein:—

Figure 1 is a top plan view of the device; Fig. 2 is a side elevation; and Fig. 3 is an elevation, largely in section on line 3—3 of Fig. 2. The scale is the same in all of the figures of the drawing.

The body member 2 of the device is preferably of cylindrical form and has pipe 4 leading outwardly and upwardly from one side thereof. Said pipe serves as a handle for the device and is preferably provided at its outer end with union nut 5 by which it may be attached to a grease gun or any other source of supply. Said body 2 has its lower face recessed at 6 to seat washer 7 of leather or other suitable material. Said washer 7 has a central hole or passage 8 therethrough communicating with chamber 9 in said body. Pipe 4 has a hole or channel 10 therethrough communicating with chamber 9 of body 2. On opposite sides of said body are slots 11, 11 in which opposite arms 12, 12 of clamp 13 slide freely. Said clamp is provided with a vertical hole therethrough, threaded for engagement with clamp screw 14. Said screw has head 15 which may be turned by hand to rotate said screw. Pin 16 is fixed in said screw just under head 15 for alternate engagement with stops 17, 17, upstanding from clamp 13, to limit the rotative movement of said screw. Arms 12, 12 are provided at their lower ends with inreaching hooks 18, 18 respectively for engaging the under face of flange 19 of head 22 of the grease cup. Body member 2 is also provided with opposite stop pins 20, 30 to stop against said flange 19 of the grease cup head as said body 2 is pushed into position thereover for use.

Grease cup 21 may be of any one of several patterns so long as it is provided with an approximately flat topped head having a flange 19 under which hooks 18, 18 are adapted to engage. Said grease cup is usually provided with spring actuated ball-headed valve 23 for closing port 24 thereof.

The operation of my improved device is as follows: Screw 14 is backed up in anti-clockwise direction until pin 16 engages upper stop 17, Fig. 1, whereby jaws 18, 18 are at their low limit of movement relative to body 2. The several parts are so arranged and proportioned that this low limit of said jaws, while permitting body 2 to be pushed onto grease cup head 22, with hooks 18, 18 under flange 19 thereof, will cause the lower face of washer 7 to scrape over the face of the head of the grease cup, thereby pushing ahead of it any accumulation of dirt thereon and also depressing valve 23. When body 2 has been pushed onto grease cup head 22 until flange 19 encounters stops 20, 30, thereby bringing said body 2 and head 22 into central alinement, valve 23 will be pressed upwardly by its spring and seat against the edges of hole 8 in said washer 7. Screw 14 is then turned a short distance in clockwise direction, binding body 2 closely to head 22, washer 7 forming a close joint between the two members. The grease is then forced downwardly through pipe 4, chamber 9 and hole 8 against valve 23, forcing its way past said valve and through cup 21 to the part to be lubricated.

To release the device it is necessary only to rotate screw 14 in anti-clockwise direction until pin 16 again encounters upper stop 17, Fig. 1, when body 2 may be withdrawn from the grease cup, valve 23 closing automatically.

I claim:

1. In a coupling the combination of a body, a grease cup having a flanged head, a clamp carried by said body for engagement with said flanged head, a tightening screw in said clamp, and means for limiting the rotative movement of said screw.

2. In a coupling the combination of a body, a grease cup having a flanged head, a clamp slidably mounted on said body, said clamp having opposite inwardly reaching ears for engagement with the flanged head of the grease cup, a screw in said clamp adapted to engage said body and draw said ears against said grease cup flange, and means for limiting the movement of the clamp screw in either direction.

3. In a coupling the combination of a body having a chamber therein, a seat below said chamber, a washer in said seat, said washer having a passage therethrough to said chamber, a pipe leading outwardly from one side of said body, said pipe connecting with said chamber, a grease cup having a flanged head, a clamp slidably mounted on said body, said clamp having opposite inwardly reaching hooks for engagement with the flanged head of the grease cup, a screw in said clamp adapted to engage said body and draw said hooks against said grease cup flange, means for limiting the movement of the clamp screw, and stops on said body for locating said grease cup flange relatively to said body.

In witness whereof, I hereby affix my signature this 29th day of June, 1918.

ABRAHAM NOVICK.